United States Patent
Caddock

[11] 3,722,084
[45] Mar. 27, 1973

[54] METHOD OF MAKING POWER RESISTORS

[76] Inventor: Richard E. Caddock, 640 Sandalwood Ct., Riverside, Calif. 92507

[22] Filed: Sept. 23, 1971

[21] Appl. No.: 183,139

Related U.S. Application Data

[60] Division of Ser. No. 40,281, May 25, 1970, Pat. No. 3,636,493, which is a continuation-in-part of Ser. No. 847,783, July 18, 1969, abandoned, which is a continuation-in-part of Ser. No. 820,538, April 30, 1969, abandoned.

[52] U.S. Cl. .................29/610, 29/613, 29/621, 264/263, 264/272, 264/273
[51] Int. Cl. .................................................H01c 17/00
[58] Field of Search.............29/610, 620, 621, 613; 264/263, 272, 273; 338/52, 226, 254, 262, 276, 314, 322; 174/DIG. 5

[56] References Cited

UNITED STATES PATENTS

| | | | |
|---|---|---|---|
| 1,531,308 | 3/1925 | Rice et al. | 338/276 |
| 2,179,566 | 11/1939 | Stoekle | 338/308 X |
| 2,844,692 | 7/1958 | Berkelhamer | 29/610 X |
| 2,880,296 | 3/1959 | Berkelhamer | 29/610 X |
| 2,960,754 | 11/1960 | Coda et al. | 29/610 X |
| 3,377,414 | 4/1968 | Weyer | 264/272 X |
| 3,541,489 | 11/1970 | Person | 338/254 X |

Primary Examiner—Charles W. Lanham
Assistant Examiner—V. A. DiPalma
Attorney—Richard L. Gausewitz

[57] ABSTRACT

A disc-shaped metal body or base of anodized aluminum has an upstanding central post, the body and post being centrally bored to receive a bolt for stacking or mounting of the resistor. A ceramic wafer or washer is seated on the body and around the post, and has a resistive film provided on the upper surface thereof. The configuration of the resistive film is such that the temperature generated in the central region of the resistor, relatively adjacent the post, thus setting up a highly effective thermal gradient which maximizes the dissipation of heat from the resistor. Terminal lugs or leads connect to the resistive film and extend outwardly generally in the plane of the washer, there being a connection between each lug and the washer by means of a rivet the ends of which are embedded in thermosetting synthetic resin. All of the components are maintained protected from the environment by a mass of thermosetting synthetic resin which extends upwardly from the film and surrounds the post, the upper surface of the resin being flush with the top of the post and parallel to the bottom of the metal body, in order to permit stacking of the resistors. The body and/or central post incorporate undercut means to prevent axial and rotational movement of the resin relative to the body, despite high thermal and other stresses.

In accordance with the method, the pre-assembled body and ceramic washer (bearing the resistive film) are mounted as inserts in a mold cavity the depth of which is approximately equal to the distance between the upper end of the post and the bottom surface of the metal body. Thus, despite the absence of a plug in the central bore in the post, no molding material enters such bore. Molding is effected by transfer molding, and the mold gate is disposed adjacent the parting line and also generally adjacent or above the ceramic washer. The terminal lugs or leads extend outwardly from the mold cavity through corresponding grooves or recesses located at the parting line.

14 Claims, 18 Drawing Figures

PATENTED MAR 27 1973 3,722,084

INVENTOR.
RICHARD E. CADDOCK
BY *Jammuty & Carr*
ATTORNEYS.

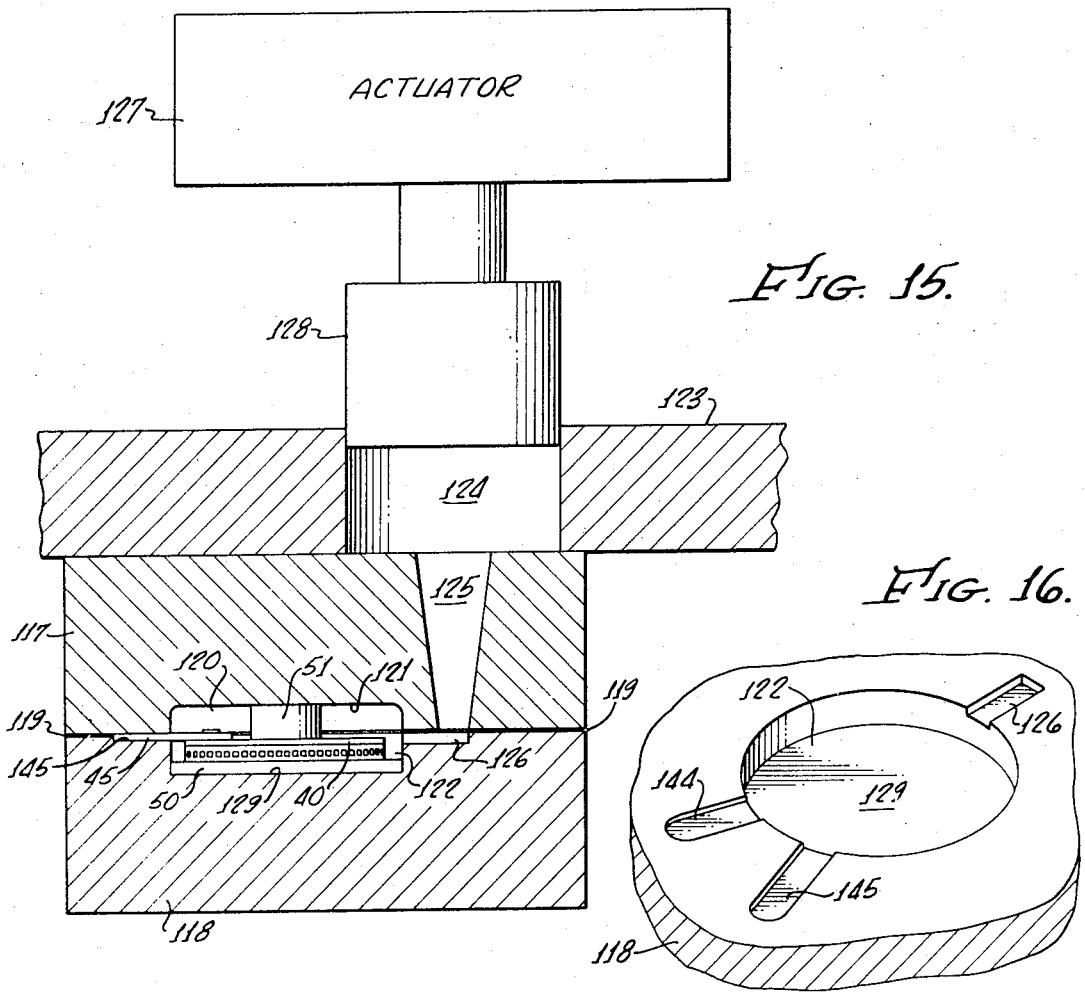
Fig. 15.
Fig. 16.
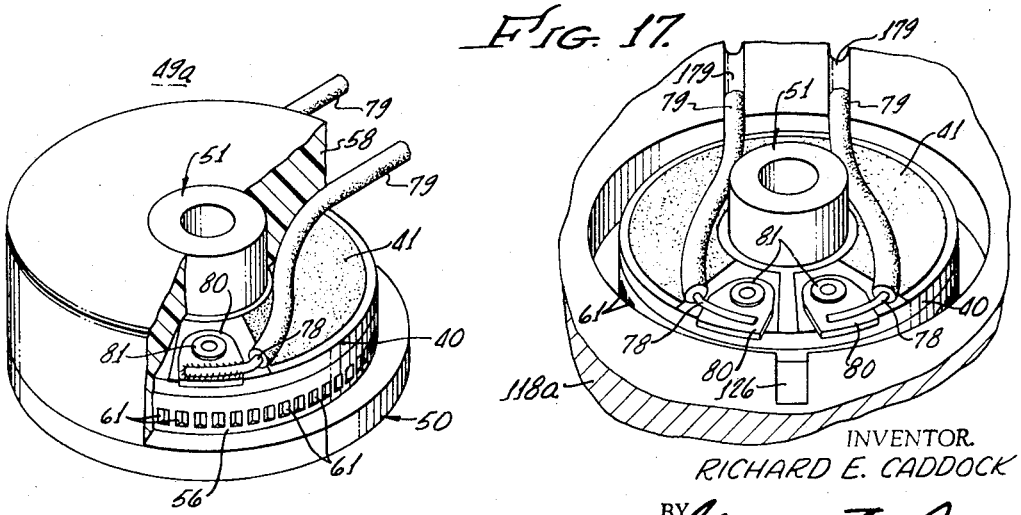
Fig. 17.
Fig. 18.
INVENTOR.
RICHARD E. CADDOCK

METHOD OF MAKING POWER RESISTORS

CROSS REFERENCES TO RELATED APPLICATIONS:

This application is a division of patent application Ser. No. 40,281, now U.S. Pat. No. 3,636,493 filed May 25, 1970, by the present applicant, for Resistor with Heat Dissipating Means. Said application is, in turn, a continuation-in-part of application Ser. No. 847,783, filed July 18, 1969, for Power Resistors, now abandoned. Application Ser. No. 847,783 is a continuation-in-part of application Ser. No. 820,538, filed Apr. 30, 1969, for Power Resistors, also now abandoned.

BACKGROUND OF THE INVENTION:

1. Field of the Invention

This invention relates to the field of electrical power resistors, wherein the dissipation of heat, the size of the resistor, the environmental protection thereof, etc., are major problems.

2. Description of Prior Art

The heat generated when components, such as power resistors, have current passing therethrough, has always been a problem in the electronics field. The problem has been magnified in recent years by the need to make electronic devices extremely compact for use, for example, in space craft. Power resistors conventionally employed in military and industrial applications are wire-wound devices of cylindrical shape. In such wire-wound devices, the heat generated near the top must travel through the same heat-sink area through which the heat generated near the bottom travels. Because of this, the temperature gradient between the bottom part of the resistor and the underlying chassis is different from the temperature gradient between the top part of the resistor and the chassis. Consequently, the heat is not removed as efficiently from the top of the resistor, which increases the possibility of hot spots near the top and thus increases the likelihood of failure.

In addition to conventional wire-wound resistors as indicated in the previous paragraph, the prior art includes numerous film-type resistors wherein the resistor material is a film (for example, of a complex metal oxide in a glass matrix). These, however, have heretofore not been able to achieve the high degree of heat dissipation required of power resistors, and/or have not been adequately protected against environmental conditions, and/or have not been sufficiently small, and/or have not been able to meet various other requirements of the electronics and other industries. Very importantly, the prior art has not provided a method of manufacturing small, lightweight, environmentally protected, stackable power resistors in a highly economical manner, and one which makes it possible to employ extremely low-cost screw-machined metal parts as major components of stackable power resistors. The prior art has not solved problems relating to heat dissipation from power resistors, the proper mounting and location of the terminals of such resistors, the ability of the resistors to withstand relatively high applied voltages, etc.

SUMMARY OF THE INVENTION

The combination of extremely small size, high rate of heat dissipation, stackability, environmental protection, and low cost are achieved, along with other major advantages, by the present invention. This is done by providing a disc-shaped metal body or base having a central hole or opening for bolt-type mounting on a metal chassis, the body supporting in heat-transfer relationship a ceramic washer or wafer on the surface of which is provided a film-type resistor of a type which generates a higher temperature toward the center (adjacent the mounting hole) than at the periphery. A thermosetting synthetic resin is molded over the body and washer and in such manner that the mounting bolt may extend through the resin, the resin serving to fully protect the resistor from the environment. The terminal conductors from the resistive film extend radially outwardly on one side of the unit, and generally in the plane of the washer. In accordance with one important feature of the invention, a bored post extends upwardly from the metal body and to the upper surface of the thermosetting resin, such upper surface being parallel to the lower surface of the body in order that the resistors may be stacked. The terminal conductors are, in accordance with another important feature, attached to the film-bearing washer by means of hollow rivets through which resin is passed, the resin serving as a dielectric to prevent any electrical discharges between the rivet and the underlying metal body. Another feature relates to the manner of locking the resin to the metal body, and to the anchoring of the terminal conductors in the resin, in order to achieve great ruggedness and a high degree of resistance to mechanical and thermal stresses. When the terminal conductors are lugs, they are provided with stress relieving and locking portions permitting flexing of the outer (exposed) portions without damage to the resistor elements. An embodiment is provided wherein metal body elements are provided above as well as below the film-bearing washer.

In accordance with the method of the invention, the body, post and film-bearing substrate (together with pre-assembled terminal lugs or wires) are mounted in a mold cavity sufficiently small that the bore in the post is blocked by the upper cavity wall. This permits use of extremely low-cost screw-machined bodies and posts, with large-tolerance (as distinguished from precision) conditions, and without employing any plugs in the mold. The method further comprises providing the terminal lugs or wires in mold recesses or grooves at the parting line of the mold, and similarly locating the mold gate adjacent the parting line and above the lower portions of the inserted body. This permits low-cost transfer molding, with minimized possibility that hydraulic forces will adversely affect the locations of the mold inserts.

BRIEF DESCRIPTION OF THE DRAWINGS

FIG. 15 is a vertical sectional view illustrating schematically a transfer molding apparatus including a mold cavity wherein are disposed the metal body and post, ceramic washer, resistive film and terminal means;

FIG. 16 is a perspective view illustrating the lower portion of the mold, but with no inserts therein;

FIG. 17 is a view corresponding to FIG. 16 but illustrating inserts wherein the terminal conductors are flexible leads as distinguished from flat metal lugs; and FIG. 18 is a view corresponding to FIG. 9 but illustrating the embodiment wherein the terminal conductors are leads as distinguished from lugs.

DESCRIPTION OF THE PREFERRED EMBODIMENTS

Figure 1:
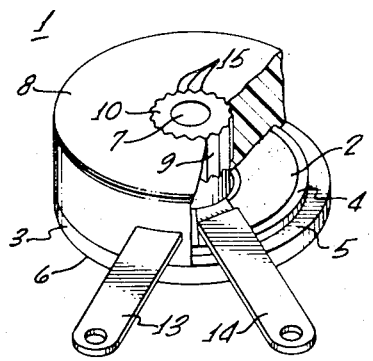
FIG. 1 is a perspective view of a power resistor, constructed in accordance with the present invention, and wherein the thermosetting resin is partially broken away in order to show the various parts enclosed thereby.

A power resistor 1 in accordance with the present invention is shown in FIG. 1 of the drawing. Such resistor 1 includes a current-carrying element, in the form of a film 2 of the resistive material, and which is provided on an underlying supporting means. Such supporting means comprises two separate elements, which are a base or body 3 and a wafer or washer 4.

The base 3 is made up of a material that is a good thermal conductor, namely a metal or a metallic alloy. Preferably, base or body 3 is anodized aluminum. The base 3 has upper and lower planar surfaces 5 and 6, respectively, which are parallel to each other. The lower surface 6 is designed to make good, flatwise, thermal contact with the chassis (formed of metal) upon which the resistor 1 is mounted, while the upper surface 5 is designed to make good, flatwise, thermal contact with the planar lower surface of the wafer 4 which supports resistive film 2.

The base or body 3 is disc-shaped and has a circular central hole 7 in the center thereof. Such hole 7 also extends (in the form of a bore) through a central post 10 which extends upwardly from the disc-shaped base 3 centrally thereof. As stated hereinafter, the disc-shaped base 3 and the post 10 may be very economically formed as a screw-machined part, the disc and post being integral with each other. All are (as above indicated) preferably anodized aluminum, it being a feature of the invention that the present method does not require that the anodized coating be broken at any time.

Surface 6 is held in contact with the chassis through the cooperation of a bolt or screw (not shown) extending through the hole 7 in post 10 (in the manner described hereinafter relative to FIGS. 12 and 13).

Element 4 is composed of material which is a thermal conductor so that the heat will be readily transmitted from the current-carrying resistive film 2 through elements 4 and 3 to the chassis upon which the resistor 1 is mounted. The material of element 4 is also an electrical insulator to isolate the current-carrying film 2 from the metallic base 3 and from the chassis upon which the resistor 1 is mounted.

The wafer 4 is a thin disc of thermally-conductive but electrically-insulating material, namely a suitable ceramic. The diameter of disc 4 is substantially smaller than that of the underlying disc-shaped body 3, as shown in FIG. 1. The wafer 4 has a circular central opening 4a (FIG. 2) which is sufficiently large in diameter to permit the wafer to be mounted over the central post 10 indicated above. The wafer or washer 4 has parallel, planar upper and lower surfaces.

The resistor 1 incorporates a very important means for holding the elements together in good thermal contact, and in a manner which achieves an extremely high degree of environmental protection. This comprises a molded thermosetting plastic (synthetic resin) 8. The plastic 8 is held in contact with the resistive film 2 and with elements 4 and 3 by an enlarged-diameter upper portion 9 of the post 10. The plastic 8 is maintained against rotational movement by the knurls 15 that are cut into the periphery of the enlarged-diameter portion 9. The shoulder 9a (FIG. 3) formed beneath enlarged-diameter portion 9 prevents shifting of the plastic in a direction axial to post 10.

Metallizing films 11 and 12 (FIG. 2) are adherently provided adjacent each other on the upper surface of element 4, in contact with the resistive film 2, to form terminations thereof for connection to terminal conductors. To these metal films 11 and 12 are electrically connected terminal conductors in the form of lugs 13 and 14, respectively, which facilitate the connection of external leads to the power resistor. The metal films 11 and 12 may be gold or a gold alloy, such as a gold-platinum alloy. The terminal lugs 13 and 14 (or flexible leads, described below) may be brazed directly to films 11 and 12 to mechanically fix the lugs 13 and 14 in place.

Particularly in those embodiments wherein the diameter of the washer opening (such as 4a) is only slightly larger than that of the lower end of the metal post, the films 11 and 12 should not extend radially inwardly to the opening but should instead terminate at edges spaced outwardly from the opening.

Figure 2:
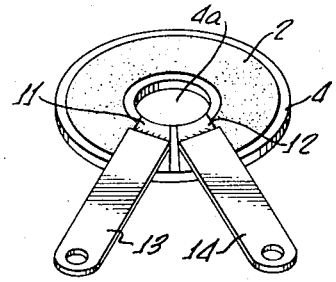
FIGS. 2 and 3 are perspective views of parts of the resistor of FIG. 1.

The particular resistive film 2 shown in FIGS. 1 and 2 is annular (or C-shaped) and covers substantially the entire upper surface of the disc or wafer (washer) 4 except adjacent the inner and outer margins thereof and except in the region of the metallizing films 11 and 12. Such films 11 and 12 make electrical contact with the resistive film 2 at only the ends of the latter. The metallizing films 11 and 12 do not contact each other but instead, respectively, make contact with the terminal lugs 13 and 14.

The C-shaped or annular resistive film 2 is one of various films described in the above-cited patent application Ser. No. 847,783, particularly relative to FIGS. 12-13 thereof, and which achieves the effect of creating a higher temperature adjacent the center of the power resistor 1 than adjacent the periphery thereof. Such embodiments of FIGS. 12 and 13 are also shown in my copending application Ser. No. 40,308, filed May 25, 1970, for Film-Type Power Resistor, and Method of Making the Same. This produces a favorable temperature-gradient relationship relative to the underlying chassis, as stated hereinafter, and thereby enhances the heat dissipation abilities of the present power resistor.

In the configuration of FIG. 2, the resistive film 2 may readily have a length that is ten times the effective width of the film, so that the film pattern produces ten squares of resistive film in series. If the resistive film has a resistance of 100 ohms per square, a resistor having a value of 1,000 ohms is thus produced. If the film has a resistance of 10 ohms per square, the resistor will have a value of 100 ohms. A variety of resistance values may therefore be produced from this basic pattern by using different resistive material.

The disc-shaped ceramic washer or wafer 4, having the hole 4a in the center, is preferably formed of aluminum oxide ceramic, although it may be formed of various other ceramics such as beryllium oxide. The resistive film 2 is adherently provided on the upper surface of the wafer or washer 4 by silk screening or other methods. Such resistive film is preferably a complex metal oxide in a glass matrix. After the film is silk screened or otherwise deposited on the upper surface of the wafer, it is baked (fired) and then treated in such manner as to achieve the precise resistance value desired. Reference is made to my copending patent application Ser. No. 40,308, filed May 25, 1970.

Figure 3:
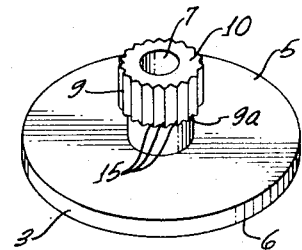

In the embodiment of FIGS. 1-3, the terminal lugs 13 and 14 are shown as being attached to the metallizing films 11 and 12 by brazing. There is described hereinafter, particularly relative to FIGS. 6, 7, 9 and 10, a method of attachment by means of rivets or eyelets. The terminal lugs may be formed, for example, of a suitable metal such as gold-plated brass or "Monel."

Figure 4:
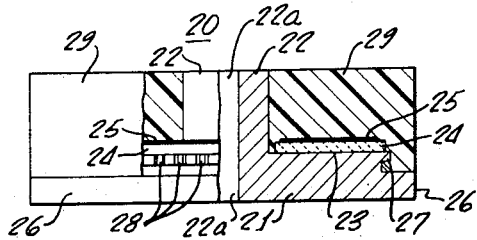
FIGS. 4 and 5 are side elevational views of other embodiments of the power resistor.

Additional embodiments for the power resistor are shown in FIGS. 4, 5, 6, 8 and 9 of the drawings (as well as in FIGS. 11 and 18 described hereinafter). In the embodiment of FIG. 4, the construction differs from the embodiment of FIG. 4 relative to the way the thermosetting plastic is anchored to the other elements of the resistor. The resistor 20 of FIG. 4 has a disc-shaped base or body 21 with a tubular central post 22 that extends above the upper planar surface 23 on which is positioned a ceramic wafer or washer 24 which supports the film 25 of resistive material. The hole or bore in the base and post is numbered 22a. The upper surface 23 of the base 21 is cut or indented back from the cylindrical outer boundary 26 thereof, and is undercut to form a lip 27. The peripheral edge of the smaller-diameter planar surface 23 (namely, the lip 27) has serrations 28 cut therein. These cooperate with the plastic 29 so that the plastic will not turn with respect to the other elements of the resistor. Additionally, the plastic is held in place (against axial shifting) by the annular groove formed beneath lip 27.

Figure 5:
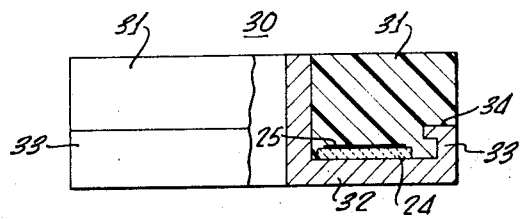

The resistor 30 shown in FIG. 5 has a construction similar to that of resistors 1 and 20, except that it has a different means for holding the molded thermosetting plastic 31 in place. In resistor 30, the base or body 32 has a vertical peripheral extension 33 and a horizontal extension (lip) 34 which hold the plastic in place. The inner edge of the horizontal extension 34 is serrated to prevent the plastic from turning with respect to the other elements of the resistor 30. The vertical extension 33 extends upwardly, and has a cylindrical exterior surface. The horizontal extension 34 extends radially inwardly in spaced relationship above the upper surface of base or body 32.

Figure 6:
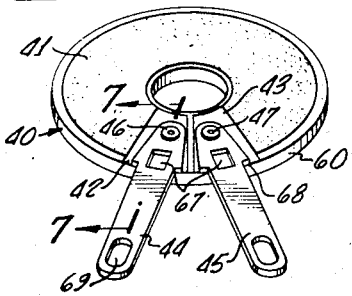
FIG. 6 is a perspective view of the washer or substrate element supporting the resistive film, and showing one embodiment of the terminal conductors for the power resistor.
Figure 7:
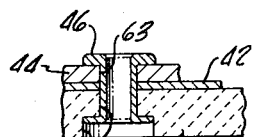
FIG. 7 is an enlarged cross-sectional view taken along a portion of the section line 7—7 of FIG. 6.
Figure 10:
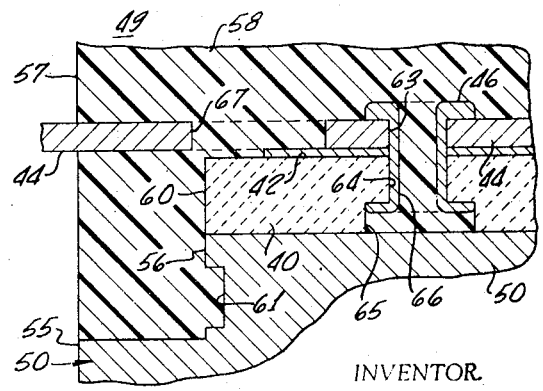
FIG. 10 is a greatly enlarged fragmentary sectional view, portions of which correspond to FIG. 7, and which shows the manner in which the thermosetting synthetic resin provides various locking, insulating and environmental protection functions.

In fixing the terminal lugs in place where they make electrical contact with the metal film at which the resistive film terminates, it is important to employ a mechanical connection that will give good electrical contact between the metal film and the terminal lug. Such a mechanical connection is shown in FIGS. 6, 7 and 10 wherein a wafer 40 has a film 41 of resistive material printed thereon. Additionally, as terminations of the resistive film 41 there are provided a metal film 42 and a metal film 43 printed on the wafer 40 at the ends of the resistive film 41. In electrical contact with the metal film terminations 42 and 43 are a terminal lug 44 and a terminal lug 45, respectively. Lugs 44 and 45 are riveted to the wafer or washer 40 by means of hollow eyelets or rivets 46 and 47, respectively. Such rivets, and the associated anchor and dielectric relationships, are described in detail hereinafter with particular reference to FIGS. 7 and 10.

There will next be described the embodiment of FIGS. 9 and 10. Such embodiment incorporates the terminal lug and rivet constructions of FIGS. 7 and 8.

The power resistor 49 (FIG. 9) has a base or body 50 of anodized aluminum, and also has a central, upwardly-extending post 51 formed integrally therewith and also of anodized aluminum. Post 51 is tubular or hollow, having a cylindrical exterior surface 52 and a smaller-diameter cylindrical interior surface 53. The latter extends clear to the bottom surface of base or body 50, thus forming the "bore" through the base 50 and through post 51 for reception of a bolt or other mounting means. Post 51 corresponds to the post 22 shown in FIG. 4.

The upper end of post 51 is disposed in a plane which is perpendicular to the common axis of base 50 and the post, thus forming a planar radial surface 54 which is parallel to the planar bottom wall of base or body 50. The difference between the diameters of the inner surface 53 and the outer surface 52 is sufficiently great that the post wall has substantial thickness, thereby creating considerable strength and also increasing the thermal conductivity of the post.

The periphery of base or body 50 is cylindrical and coaxial with the post surfaces 52 and 53. Stated more definitely, such base is peripherally stepped or indented to provide two peripheral cylindrical surfaces, namely a larger-diameter surface 55 and a substantially smaller-diameter surface 56 (FIGS. 9 and 10).

The larger-diameter cylindrical surface 55 of base 50 is flush with a cylindrical wall 57 of the thermosetting synthetic resin (plastic) 58 which holds the parts in position and provides environmental protection, insulating and locking functions as described in detail below. The plastic also has an upper surface 59 disposed in a plane perpendicular to the axis of the resistor and flush with the radial wall or end 54 of post 51. The junction of cylindrical surface 57 with radial surface 59 is preferably rounded or radiused.

Figure 9:
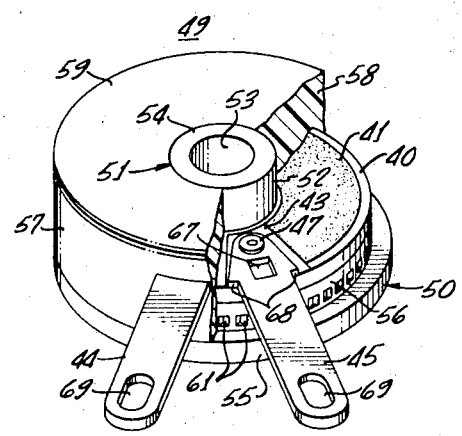
FIG. 9 is a perspective view, with portions broken away, corresponding to FIG. 1 except showing a different embodiment of the invention.

The smaller-diameter cylindrical surface 56 shown in FIGS. 9 and 10 is substantially flush with the corresponding cylindrical edge 60 (FIG. 10) of the ceramic wafer or washer 40 described above relative to FIGS. 6 and 7. Such surface 56 has formed therein throughout the entire circumference thereof a plurality of spaced "sprocket" holes or recesses 61. Each such "sprocket" hole or recess 61 is spaced below the upper surface of the central region of base 50 (the surface on which the ceramic 40 rests), so that resin 58 entering each hole 61 will not only prevent rotational movement of the body relative to the resin but will also prevent axial movement thereof relative to the resin (in a direction parallel to the axis of the resistor).

As previously indicated, the base 50 and its integrally-associated post 51 are screw-machined parts formed inexpensively of aluminum and then anodized.

The remainder of the embodiment of FIGS. 9 and 10 will be described hereinafter relative to the rivets or eyelets 46 and 47 and associated recess and anchor means for the respective terminal lugs 44 and 45. A layer of suitable thermally-conductive and heat-resistive adhesive may be provided between the lower surface of ceramic washer 40 and the upper surface of the body 50, thus insuring against any separation therebetween. Such adhesive may comprise, for example, a polyamide resin.

GENERAL OPERATION OF THE ABOVE-DESCRIBED RESISTORS 1, 20, 30 AND 49, AND OF THE RESISTORS DESCRIBED HEREINAFTER RELATIVE TO FIGS. 11 AND 18

As indicated above, each of the resistors described in the specification is rigidly and tightly secured to an underlying chassis plate or fin (formed of aluminum or other excellent thermal conductor), by means of a bolt which extends through the central bore in the metal body and post. There is therefore excellent, flatwise heat-transfer contact between the bottom surface of the base or body and the upper surface of the chassis.

Each of the resistors described in the present specification is of laminar construction, there being an equal length thermal path from each portion of the resistive film to the adjacent portion of the underlying chassis. Thus, for example, and referring to FIG. 4, the distance from the peripheral edge of resistive film 25 downwardly (vertically) to the bottom surface of base or body 21 is equal to the distance between the inner edge of such film 25 downwardly (vertically) to the bottom surface of base 21. Accordingly, there is excellent transfer of heat from the resistive film 25 (or other film described herein) to the chassis.

The amount of heat transferred through the thermosetting synthetic resin (such as 8, 29, 58, etc.) is relatively small since such resin is not a good thermal conductor. It is an important feature of the present invention that, despite the fact that the resin is not a good thermal conductor, the heat dissipation characteristics of the present resistor are far more favorable than are the heat dissipation characteristics of power resistors conventionally employed in the art.

Although the resin is not a good thermal conductor, it is emphasized that the central post (such as 10, 22, 51, etc.) is an excellent thermal conductor and aids in transmitting heat from the body or base to the surrounding region (especially when stacking is effected as described hereinafter relative to FIGS. 12 and 13). Also, where the bolt employed to mount the resistor has an outer diameter substantially equal to the inner diameter of the post, and where the bolt is formed of a good thermal conductor, such bolt aids in dissipating heat from the resistor.

As described above, the resistive film 2, 25, 41, etc. (and certain other films, such as those described in copending application Ser. No. 40,308, filed on May 25, 1970) has such a configuration that the temperature adjacent the post is greater than at the periphery of the resistor. For example, and referring to the particular resistive film illustrated in the drawings of the present application, the length of the current path around the smaller-diameter portion of the film is much shorter than is the length of such path around the larger-diameter portion of the film. Accordingly, the current flowing through the resistor tends to be greater at regions near the post than at regions remote therefrom. Since the power (and thus generated heat) is equal to the square of the current times the resistance, it follows that there will be more heat generated near the post than remote therefrom. The temperature is therefore greater near the post than remote therefrom, and (since the thermal paths from all portions of the resistor to the underlying chassis plate are the same) the temperature at the chassis portion relatively adjacent the central post will be greater than the temperature relatively adjacent the periphery of the resistor body.

There is therefore set up on the chassis plate or fin a thermal gradient which is favorable to the efficient conduction of heat away from the resistor, it being emphasized that heat tends to flow from hot to cold and that therefore a higher temperature in the center will tend to cause flow of heat from such center radially outwardly through the chassis plate or fin.

Because of the above and various other factors, such as those discussed below, the power resistors of the present invention, even though very much smaller in size than the wire-wound power resistors conventionally employed, easily exceed the requirements for power resistors established by the Department of Defense and as set forth in Military Specification Manual MIL-R-18546.

As but one example, a power resistor manufactured in accordance with the present invention, and having a rating of 30 watts, is only about one-half the size of a conventional commercial power resistor having a power rating of only 25 watts. Such commercial (last-mentioned) resistor is approximately the size for a 20-watt resistor by the Department of Defense in its specification manual MIL-R-18546.

The 30-watt resistor indicated in the preceding paragraph is less than one inch (namely, 0.85 inch) in diameter and is only one-quarter inch in thickness. When fastened to an aluminum chassis plate, the resistor has higher power capabilities than any resistor of comparable size previously available in the art.

As another example, a 15-watt unit manufactured in accordance with the present invention has a diameter of only 0.60 inch, and is only 0.188 inch thick.

The resistors may be economically manufactured to close resistance tolerance, such as plus or minus one percent. The insulation resistance is high, such as 10,000 megohms, dry. In addition, such factors as moisture resistance, life, etc., exceed military requirements.

The resistance of the present resistors to thermal shock, mechanical shock, vibration, etc., is extremely high. Because the thermosetting synthetic resin is locked to the metal base or body not only against axial movement but also against rotational movement, factors such as mechanical and thermal shock do not separate the resin from the metal. The assembly is thus maintained in a unitary condition and capable of resisting attack by moisture, etc.

It is also emphasized that the thermosetting resin is the housing for the resistor, there being no "potting" or other requirements.

It is a major feature of the present power resistors that they are noninductive, particularly in comparison to conventional wire-wound power resistors which have relatively high inductance. Although wire-wound resistors may be made with relatively low inductance by employing bifilar winding techniques, these are expensive and the need therefor is eliminated by the present resistor.

By using different shapes, thicknesses, etc., of resistive film, the present resistors of standard size may be made with a very wide variety of resistance values. For example, the resistance values may range from 10 ohms to 200 kilohms without changing resistor size. Reference is made to copending patent application Ser. No. 40,308, filed on May 25, 1970, for further description of methods of obtaining different resistance values.

It is important that the present resistors are characterized by relatively little "drift" of (change in) resistance value, despite extreme changes in environment such as relative to temperature. For example, in the operating range of from 25° C. to 275° C., the drift in resistance value is less than one-half of 1 percent for each 100° C. temperature change.

The present resistor, being characterized by the circular or washer-shaped configuration, with the mounting hole in the middle, is relatively cheap to manufacture, thin, small in diameter, light in weight, and extremely convenient to mount (either singly or in stacks) in effective heat-transfer relationship to a chassis or fin.

Because the terminal lugs or wires are disposed on only one side of the resistor, it is very convenient to mount the resistor in various types of electrical circuits. Furthermore, by locating the terminal lugs on only one side of the resistor, the greatest possible surface area of the ceramic wafer is utilized, and in an efficient manner.

FURTHER DESCRIPTION OF TERMINAL CONSTRUCTIONS, BOTH LUGS AND FLEXIBLE LEADS

Referring to FIGS. 6, 7, 9 and 10, the mechanical mounting of each of terminal lugs 44 and 45 is made by inserting one of the rivets or eyelets 46 and 47 through registered holes in the lug and in ceramic wafer 40. Since each of the mechanical connections is identical to the other, only one (that relative to terminal lug 44) will be described in detail.

The rivet or eyelet 46 associated with lug 44 is extended through a hole 63 in such lug, and also through a hole 64 in ceramic wafer 40. The underside of wafer 40 is provided with a "counterbore" 65 registered with hole 64, the size of the counterbore being sufficiently large that the lower rivet end ("head") will be spaced well above the lower surface of the wafer 40 as illustrated. The upper end of rivet or eyelet 46 is rolled over the upper surface of terminal lug 44, thus making good electrical contact between such terminal lug and the underlying metal film 42, while also firmly mechanically attaching the lug to the washer.

The hole or passage 66 in hollow rivet 46 is sufficiently large in diameter, and the amount of recessing of the lower end of the rivet relative to the plane of the bottom wall of wafer 40 is sufficiently great, that the resin 58, during molding thereof, will flow through the hole or bore 66 and will completely fill the counterbore below the rivet. This is an important consideration, because the portion of the resin below the rivet serves as an insulator or dielectric to prevent electrical discharges from occurring between rivet 46 and the base or body 50. Thus, for example, a voltage of on the order of 300 volts may be applied to the terminal lug 44 without resulting in any discharge or arcing to base 50.

The inner end of each of the terminal lugs 44 and 45 is provided with a rectangular opening 67, such opening being disposed primarily over the ceramic wafer 40 at the peripheral portion thereof. Each such opening performs two functions, namely: (1) a stress-relief function whereby bending, shock and vibration applied to the external portion of the terminal lug will be absorbed in the vicinity of the opening 67 instead of being transmitted to the rivet 46 or 47 or associated part, and (2) an anchoring function in that the opening fills with the thermosetting resin 58 and therefore tends to maintain the terminal lug in position despite strong pulling forces exerted on the projecting end thereof.

The inner end of each lug 44 and 45 is also shaped generally as an arrow point (except rounded at the extreme inner end), so that laterally-extending shoulders (or steps) 68 are provided. These also provide an anchoring function tending to minimize the possibility of pulling of either terminal lug out of the resistor. The shoulders or steps 68 are, like the opening 67, spaced radially inwardly from the peripheral surface 57 of the resin 58.

Figure 8:
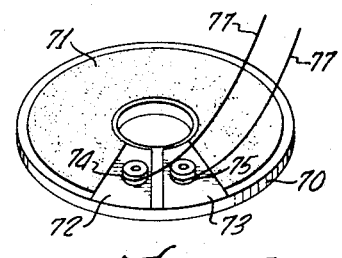
FIG. 8 is a perspective view of the washer element, showing a connection for wire leads to the resistor.

Proceeding next to a description of terminal conductors in the form of flexible-wire or lead terminals or connectors, as distinguished from lugs, FIG. 8 illustrates a ceramic wafer 70 having a film 71 of resistive material provided thereon and which terminates in metal-film terminals 72 and 73. Metal bobbins, eyelets or rivets 74 and 75 are provided in electrical contact with films 72 and 73, respectively. Such bobbins 74 and 75 may be attached to wafer 70 in the same manner as the rivets 46 and 47 are attached to wafer 40, and as illustrated in FIG. 10 so that a layer of plastic or resin is provided between the lower bobbin ends and the underlying surface of metal base 50.

A wire lead 77 is wrapped around the upper end of each bobbin 74 and 75, and is suitably soldered or otherwise affixed to such bobbin. Alternatively, the wire leads 77 may be attached directly (as by brazing) to the metal film terminals 72 and 73.

A length of each of the wire leads 70 is maintained within the resin 58 to thereby prevent the wire leads from being readily torn from the terminals. More specifically, a length of lead 77 equal to or greater than five diameters of the wire is embedded in the compound or plastic (resin). Each lead 77 is insulated, as described below relative to FIG. 18. The diameter of the "wire", referred to in the second sentence of this paragraph, is not that of the conductor but instead the outer diameter of the insulating sleeve on the conductor.

FIG. 18 illustrates the same resistor that is illustrated in FIGS. 9 and 10, except with flexible-lead terminations instead of terminal lugs. Thus, the resistor of FIG. 18 is given the number 49a.

The resistor 49a incorporates two insulated leads 78 each formed of thin strands of aluminum, silver, copper, etc. Each lead is covered with a tubular "Teflon" insulating sleeve 79. The leads are mounted, respectively, on opposite sides of the center post 51. This is shown in FIG. 17, which relates to the molding of the resistor 49a. Prior to such mounting, the exposed end of each lead 78 is connected (as by silver brazing) to the upper surface of a terminal lug 80. Each terminal lug is connected to the ceramic wafer or washer 40, in the manner described relative to FIG. 10, by a rivet 81 the lower end of which is insulated from body 50 by a portion of resin 58.

As shown in FIGS. 17 and 18, the leads are connected to the wafer on one side of the resistor 49a (i.e., on one side of post 51) but are then passed generally diametrically thereacross (on opposite sides of post 51, as shown in FIG. 17) and emanate from the resin 58 on the opposite side of the resistor. Thus, the leads are embedded in the resin or plastic for at least the five wire diameters (outer diameters of sleeves 79) referred to above. The lead portions which are disposed over the resistive film 41 do not make contact therewith due to the presence of the insulating sleeves 79.

DESCRIPTION OF FIGS 11-14, INCLUSIVE

As previously stated, it is a major feature of the invention that the various resistors described herein may be mounted in stacked relationship relative to each other, with cooling fins or plates disposed therebetween. Thus, the upper and lower surfaces of each resistor (at least one such surface being thermally highly conductive) are parallel to each other. Furthermore, the tubular metal posts insure against crushing of the resin or plastic, and aid in dissipation of the generated heat. Another reason why such stacking is permitted is that the terminal conductors do not extend out of the upper and/or lower surfaces but instead are disposed between the same. Such terminal conductors are on the same side of the resistor in order that electrical connections to the resistor may be facilitated, and in order that the surface of the ceramic washer may be utilized in the most efficient manner.

Figure 12:
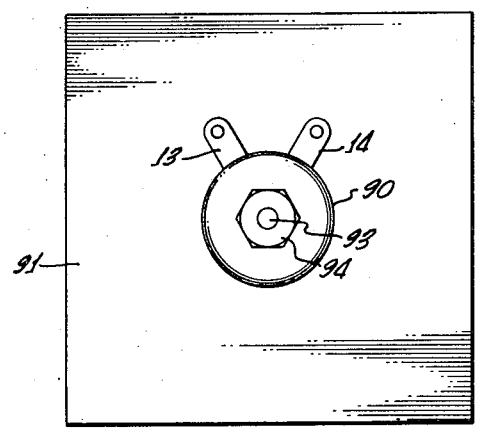
FIG. 12 is a top plan view of a stack of power resistors between which are interposed a plurality of cooling fins.
Figure 13:
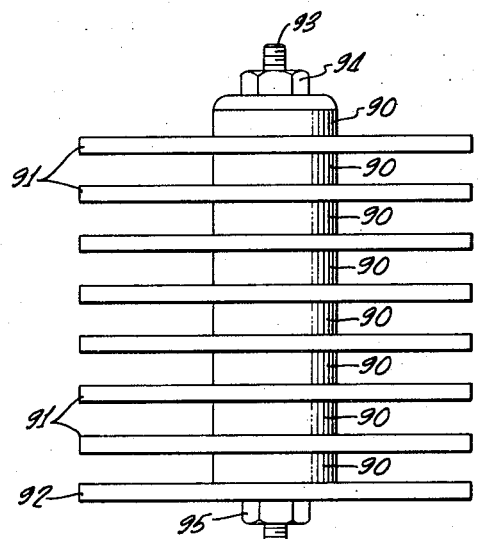
FIG. 13 is a side elevational view of the showing of FIG. 12.

Each of the resistors shown in FIGS. 12 and 13 is designated by the numeral 90 and is the same as shown in FIG. 4. Each such resistor 90 may also be identical to the ones shown in other figures which show complete resistors (for example, FIGS. 9, 18 etc.).

In FIG. 13, eight of the power resistors 90 are shown as separated by rectangular, thermally-conductive plates 91 preferably formed of aluminum. End plates, such as plate 92, may also be included in the stack. The stack is held together by a bolt 93 and its cooperating nuts 94 and 95, such bolt 93 passing through the central holes in the resistors 90 and also through holes in plates 91 and 92. The holes in the plates 91 and 92 have the same diameters as do the holes in the resistors.

The stack may be mounted with the plates or fins in a vertical position, or in a horizontal position, or in some intermediate position. When the stack is mounted with the plates or fins in the vertical position, a larger amount of heat is carried off by convection currents.

Figure 14:
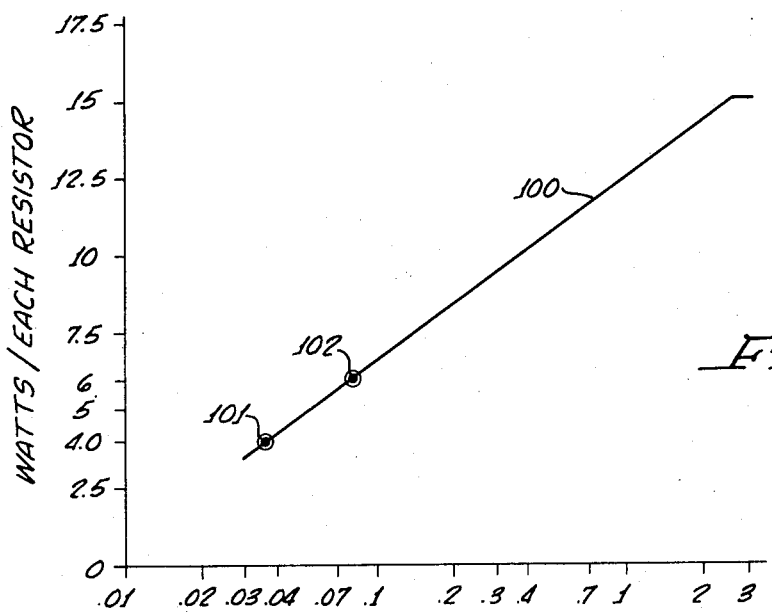
FIG. 14 is a graph or chart showing the variations in power ratings when the power resistors are stacked with cooling plates interposed therebetween, and with air forced across the stack at various rates.

A chart or graph showing various possible power ratings for individual power resistors of the type shown in FIG. 4, for example, and when stacked as shown in FIGS. 12 and 13, is shown in FIG. 14. Such figure relates to data concerning stacks wherein each plate 91 and 92 is 2 inches by 2 inches by 0.04 inch, and is formed of aluminum. Each of the resistors 90 (of the type shown in FIG. 4, for example) has a diameter of about six-tenths of an inch.

Line 100 of FIG. 14 representatively shows the power rating versus air flow across the individual resistors and plates of the stack. The measured power rating of the individual resistors with cooling by convection only, and when the plates were positioned in a horizontal plane, is shown by dot 101 on line 100. The increased power rating when the plates were positioned in a vertical plane is shown by dot 102 on line 100.

Air at 25° C. and at 1.0 atmospheres was ducted around the resistors in the stack to produce the curve 100 of FIG. 14. The air flow was measured in cubic feet per minute (CFM) and provided sufficient cooling to greatly increase the power rating of the resistors in comparison to the rating with convection cooling only.

The combination of the stacking and the ducted air, for cooling purposes, not only increases the power rating of the resistors, but also provides an effective way of localizing and removing the heat generated by the resistors. As but one example, a stack of the resistors may be located in a computer, and air may be ducted over the stack and then vented to the room. This cools the resistors without heating the air in the interior of the computer. Of course, fluids (gases and liquids) other than air may be employed to cool the resistors.

Figure 11:
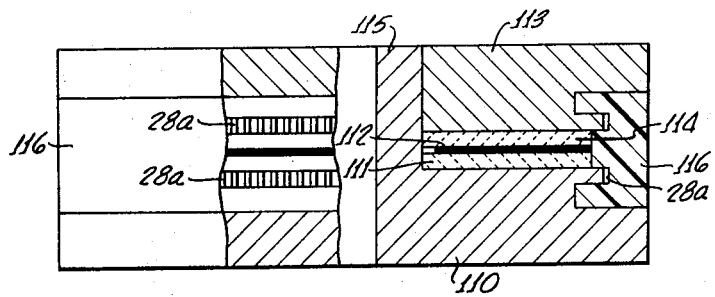
FIG. 11 is a view, partially in vertical section and partially in elevation, illustrating an additional embodiment of the invention wherein disc-shaped metal bodies are provided above and below the film-bearing substrate washer.

Referring next to FIG. 11, there is illustrated a power resistor which is more expensive to manufacture than the others described in this specification, but which is adapted for stacking as stated above relative to FIGS. 12 and 13.

The resistor of FIG. 11 has a first metal base 110 of disc-shaped construction similar to the base or body 21 of FIG. 4. The resistor further includes an electrically-insulating (ceramic) wafer or washer 111 positioned on the base 110. The wafer 111 carries a film 112 of resistive material, and also carries termination means such as terminal lugs or leads (not shown). On the side of the resistive film 112 opposite the base 110 is located a second base 113 separated from the resistive film 112 by an electrically-insulating (ceramic) wafer 114. The base 110 has the previously described center post 115, which projects through openings in washers 111 and 114, and through a corresponding opening in the second base 113.

The elements are held together by molded thermosetting plastic (synthetic resin) 116 which locks in undercut edges in the bases 110 and 113, similarly to the locking provided in the resistor of FIG. 4 and including serrations 28a. The resistive film 112 is thus sandwiched between two bases having smooth mounting surfaces for attaching to cooling fins.

METHOD OF THE INVENTION

Referring next to FIG. 15, there is schematically represented the transfer molding apparatus adapted to be employed in molding the thermosetting synthetic resin (plastic) such as 8, 29, 31, 58 and 116.

The mold apparatus illustrated in FIG. 15 comprises an upper mold member 117 having a lower planar surface, and a lower mold member 118 having an upper planar surface. The two planar surfaces are adapted to meet each other in flatwise engagement (except at the cavities, gates, etc.) at the "parting line" 119.

Upper mold 117 has formed in the lower surface thereof an upper mold cavity 120 which is generally cylindrical in shape, and which corresponds to the portion of each resistor 1, 20, 30, 49, etc., generally above the ceramic wafer or washer 4, 24, 40, etc. The "bottom" wall of upper mold cavity 120, namely the mold surface 121 shown in FIG. 15, is planar.

Formed in the upper portion of lower mold member 118 is a lower mold cavity 122 the shape of which corresponds generally to the shape of each resistor at a region generally below the wafer or washer 4, 24, 40, etc. The upper and lower mold members 117 and 118 are adapted to be locked to each other by suitable means, not shown, and with the upper and lower mold cavities 120 and 122 registered with each other. Suitable means, such as electric heating elements, not shown, are provided to maintain the mold in heated condition.

A platen 123, which is also heated by a suitable means, not shown, is provided above and in contact with the upper surface of upper mold member 117. The platen has a cylindrical "transfer pot" 124 therein and which communicates/with a downwardly-convergent sprue 125 in member 117. The lower end of the sprue, in turn, communicates with a laterally-extending gate or runner 126 and thus with the mold cavity. More specifically, the gate or runner 126 is formed in the upper wall of lower mold member 118, so that resin passing therethrough will enter the lower mold cavity 122 and will then flow to the upper mold cavity. Sprue 125 may also be located in lower mold 118, in which case the platen and transfer pot are provided beneath the mold instead of thereabove.

Alternatively, a gate or runner (not shown) may be provided in the lower wall of mold member 117, preferably at a region adjacent the parting line 119.

Suitable means, including an actuator schematically represented at 127 and a piston schematically represented at 128, are employed to force thermosetting resin downwardly from transfer pot 124 through sprue 125 and gate or runner 126 into the mold cavity. The piston 128 fits in the transfer pot and thus is adapted, upon downward movement of the piston, to force the heated thermosetting resin into the mold cavity under pressure.

The thermosetting synthetic resin employed in practicing the present method is preferably a thermosetting silicone molding compound containing a filler of very short glass fibers and silica. Such a thermosetting silicone compound is molded at about 350° C. After molding, the molded parts are placed in an oven and postcured first at 150° C. and then at 300° C.

As shown in FIGS. 15–17, inclusive, the upper surface of the lower mold member 118 (or of the corresponding lower mold member 118a, FIG. 17, employed for molding of embodiments, such as that of FIG. 18, wherein flexible leads are molded into the resistor) is recessed to receive the terminal lugs (or leads). Thus, FIG. 16 shows recesses 144 and 145 in the upper surface of the lower mold. These are shaped to snugly receive lugs 44 and 45, which are flat or strip-like. FIG. 17 illustrates grooves or recesses 179 in the upper surface of the corresponding lower mold member 118a, and adapted to receive in snug relationship the insulating sleeves 79 on the leads 78 of the embodiment of FIG. 18.

It is important to the present method that the spacing between the upper cavity wall 121 and the opposed bottom wall 129 of lower mold cavity 122 is, when the mold is fully closed, substantially equal to the spacing between the upper end of the metal post and the lower surface of the body or base (that is to say, for example, the spacing between the radial end 54 and the bottom wall of base 50, FIG. 9). Preferably, the spacing between the upper end of the post (such as post 51 in FIG. 9) and the bottom wall of the base (such as base 50, FIG. 9) should be 1 or 2 thousandths of an inch greater than the distance between mold walls 121 and 129 when the mold is empty and is fully closed. Thus, when the base, post and associated parts are mounted in the mold cavity as shown in FIG. 15, the mold will not close completely but will instead be in contact with the upper end of post 51 and the lower surface of base 50. There will then be a very slight gap (such as one or two thousandths of an inch) at the parting line 119. Such gap is shown, in exaggerated manner, in FIG. 15. With such a relationship, or even when there is a very slight gap, such as one or two thousandths of an inch, between the upper end 54 (FIG. 9) of post 51 and the opposed upper mold wall 121, the molding compound will not flow downwardly into the bore or hole in the post.

The relationship described in the previous paragraph makes it unnecessary to employ plugs in association with the mold, which plugs would otherwise be inserted into the bore or passage through the post in order to prevent ingress of resin. Since no plugs need be employed in the mold, there are no problems relative to concentricity, tolerance, etc., which makes it possible to employ extremely inexpensive screw-machined parts for the base (such as 50) and the post (such as 51) integral therewith.

The fit of the base 50 in lower mold cavity 122 is sufficiently close or snug that no substantial amounts of resin will flow downwardly past cylindrical wall 55 (FIGS. 9 and 10). However, the sizes of rivet passage 66 and of counterbore 65 (and the spacing between the lower rivet end and the upper surface of base 50) are sufficiently great (much more than a few thousandths of an inch) that resin will fill the rivet and the counterbore.

The method of the invention will next be summarized relative to the particular resistor 49 shown in FIGS. 9 and 10, and containing the resistive element shown in FIG. 6 (or containing certain other resistive elements such as those described in application Ser. No. 40,308, filed May 25, 1970).

A disc-shaped base 50, and the integrally associated hollow post 51, are formed on a screw machine of aluminum stock and then anodized. The ceramic wafer or washer 40 is formed in a press, and providing the hole 64 and counterbore 65 (FIG. 10). The washer is then fired. Thereafter, it is silk screened or otherwise provided with termination films 42 and 43 of metal. The washer 40 is then fired again to cause the metal films to adhere firmly thereto. The resistive film 41 is then applied by silk screening or other means. Thereafter, the washer 40 is again fired and then abraded to achieve the desired resistance value, as described in the copending application Ser. No. 40,308, filed May 25, 1970.

The terminal lugs 44 and 45 are riveted to the wafer by rivets 46 and 47. Alternatively, and as shown in FIGS. 17 and 18, the terminations are made by rivets which secure to wafer 40 the lugs 80 connected to "Telfon" protected leads 78. The lower surface of each wafer 40 may then be adhesively secured to the upper surface of base 50 as indicated above.

The insert thus formed is then mounted in the mold cavity as shown in FIG. 15, with the terminal lugs 44 and 45 in the corresponding recesses 144 and 145 (FIG. 16) in lower mold member 118. Alternatively, such recesses could be formed in the upper mold member 117. When the terminal conductors are flexible leads 78, 79, they fit in grooves 179 in mold portion 118a (FIG. 17).

It is a feature of the invention that, as shown in FIG. 15, the gating (gate 126, for example) is substantially in the plane of the parting line 119, which parting line is parallel to and adjacent the ceramic wafer 40 and the resistive film 41 thereon. The gating may also be in a plane somewhat above the ceramic wafer 40 and associated resistive element. However, the gating should not be substantially below the wafer 40 since the hydraulic forces incident to molding would then tend to effect disassembly of the washer 40 from the underlying base. Such disassembly could only occur between the wafer 40 and the base, it being emphasized that all portions of the base 50 and post 51 are locked in the mold by the relationship (described above) between surfaces 121 and 129. Thus, the post 51 performs the additional function of effectively locking the base in position.

Because of the indicated gating, the step of providing an adhesive between wafer 40 and the body or base 50 may be omitted.

It is also an important feature that the terminal lugs or the corresponding flexible leads emanate from the mold cavity in substantially the plane of parting line 119, and in generally the plane of wafer 40. Thus, the terminal lugs or leads are on the side of the part, not the top or bottom, so that the parts may be stacked. In addition, the described relationship greatly facilitates the molding operation.

After the assembled parts have been placed in the mold as shown, the above-described transfer molding operation is effected to completely fill the voids in the mold cavity 120, 122 with the thermosetting synthetic resin. The mold is maintained closed until the resin sets, following which the above-indicated post-curing operation is performed. After the mold opens, it is a simple matter to clean out the material in runner 126 and prepare the mold for a new operation.

It is emphasized that the material entering the mold may readily flow around the annular groove formed between the cylindrical wall of lower mold cavity 122 and the indented wall 56 (FIGS. 9 and 10) of the base and immediately beneath wafer 40. The molding material may not, however, flow adjacent the bottom portion of base 50.

The described operation provides a finished resistor characterized by an extreme degree of environmental protection, by firm locking of the thermosetting resin to the inserts, and by the other major features described above. The upper surface of the resin is flush with the upper end of post 51, as is particularly desirable for stacking, heat-transfer, and other purposes.

As indicated above in the first paragraph under the subhead "Method of the Invention", the molding apparatus of FIG. 15 is also employed in molding the resin 116 (FIG. 11). Thus, the resistor of FIG. 11 is molded in the same manner as are the resistors of FIGS. 9 and 18, except that the wafer 114 and the base 113 are mounted in the mold cavity (along with base 110 and wafer 111) before resin is injected.

As indicated above, the terminal lugs 13, 14, 44, 45, are flat bands or strips of metal. Such lugs are relatively thin, and have parallel planar upper and lower surfaces. They also have parallel edges except at the "arrow points" forming shoulders 68, FIG. 9.

The "Teflon" insulating sleeves 79 for the leads 78, FIGS. 17 and 18, are heat-resisting and therefore are not damaged by the above-described transfer molding operation.

The generally annular "C-shaped" resistive films 2, 41, etc., have concentric inner and outer circular edges (interrupted at the termination regions). Such edges are, respectively, near the inner and outer marginal edges of the washer 4, 40, etc.

The use of the term "wafer", as employed in the present specification and/or claims, is not intended to denote or imply that the insulating substrate for the resistive and metal films is circular or round.

I claim:

1. A method of environmentally protecting, heat-sinking, and adapting for stacking, a current-carrying electrical component, which comprises:

providing a heat-transmissive metal base having a predetermined perimetrical shape, and having an upwardly-extending tubular post the opening through which communicates with a corresponding opening through said base, the upper end of said post at regions encompassing said opening, and the lower surface of said base, being planar and parallel to each other, mounting a current-carrying electrical component over said base in effective heat-transfer relationship thereto, disposing said metal base, said post and said current-carrying component in a mold cavity having an upper wall portion parallel to and above said upper end regions of said post, causing said upper end regions of said post to be closely adjacent said upper cavity wall portion, preventing substantial flow of resin to regions below the lower surface of said base, and effecting transfer molding of a thermosetting synthetic resin into said mold cavity above said base and under conditions such that said resin will not flow between said end regions of said post and said cavity wall portion, and therefore does not enter said openings in said base and in said post, but does effectively seal said current-carrying component to environmentally protect the same without preventing mounting of said lower surface of said base in heat-transfer relationship to a metal chassis, whereby a plurality of the assemblies may be stacked, in alternation with cooling fins, on a bolt extended through said openings.

2. The invention as claimed in claim 1, in which said method further comprises providing not over a few thousandths of an inch clearance between said upper end regions of said post and said upper wall portion of said mold cavity during said transfer molding step.

3. The invention as claimed in claim 1, in which said method further comprises causing said mold cavity to have a lower wall parallel to said upper wall portion thereof, and causing the distance between said upper wall portion and said lower cavity wall, during molding, to be substantially equal to the distance between said upper end regions of said post and said lower surface of said base.

4. The invention as claimed in claim 3, in which said method further comprises defining said mold cavity by means of an upper mold element and a lower mold element adapted when said mold cavity is empty to meet at a parting line intermediate said upper mold wall portion and said lower mold wall, and in which said method further comprises causing the distance between said upper end regions of said post and said lower surface of said base to be greater than the distance between said upper wall portion and said lower mold wall when said upper and lower mold elements are in contact with each other, the amount greater being not over a few thousandths of an inch whereby to prevent outflow of resin through said parting line between said upper and lower mold elements.

5. The invention as claimed in claim 3, in which said method comprises defining said mold cavity by means of an upper mold element and a lower mold element adapted when said mold cavity is empty to meet at a parting line intermediate said upper mold wall portion and said lower mold wall, and further comprises providing first and second terminal conductors in electrical contact with the terminals of said current-carrying component, causing said conductors to extend radially outwardly and generally parallel to said lower surface of said base, and causing the outer portions of said conductors to be disposed snugly in recesses in at least one of said upper and lower mold elements during the molding operation.

6. The invention as claimed in claim 1, in which said method further comprises employing as said thermosetting synthetic resin a thermosetting silicone resin containing very short particles of fiber.

7. The invention as claimed in claim 1, in which said method further comprises employing as said metal base and post an integral part formed of aluminum and anodized, said part being shaped to cause interlocking with said synthetic resin whereby to prevent movement of said synthetic resin relative to said base and post as the result of mechanical or thermal stresses.

8. The invention as claimed in claim 1, in which said method further comprises employing as said current-carrying component a film-type resistor adhered to an insulating ceramic wafer.

9. A method of manufacturing an environmentally-protected film-type power resistor, which comprises:

providing on the upper surface of an electrically-insulating and heat-transmissive planar wafer a film of resistive material, providing a metal base having planar upper and lower surfaces, disposing the lower surface of said wafer on the upper surface of said base in effective flatwise heat-transfer relationship thereto, disposing the thus-assembled wafer and base in a mold cavity, and transfer molding a thermosetting synthetic resin into said mold cavity above said base by injecting said resin through a gate disposed in a plane located at an elevation at least substantially as high as that of said wafer, whereby the hydraulic forces incident to said transfer molding step do not separate said wafer from said base.

10. The invention as claimed in claim 9, in which said method further comprises providing on the upper surface of said base an upwardly-extending tubular post which extends through a hole in said wafer, and causing the upper end of said post to substantially engage the upper wall of said cavity whereby to prevent inflow of synthetic resin into the opening in said post.

11. The invention as claimed in claim 9, in which said method further comprises causing the wall of said cavity adjacent the peripheral edge of said base to correspond substantially to the size and shape thereof, whereby to prevent flow of resin between the peripheral edge of said base and the wall of said cavity or between the lower wall of said cavity and the lower surface of said base, whereby said base may be mounted in effective heat-transfer contact with a chassis.

12. The invention as claimed in claim 11, in which said method further comprises causing said peripheral edge of said base to be circular.

13. The invention as claimed in claim 9, in which said method further comprises connecting termination conductors to said resistive film, causing said conductors to extend outwardly from said film generally in the plane thereof, defining said mold cavity by means of upper and lower mold elements having a parting line located adjacent the plane of said film, and causing at least one of said upper and lower mold elements to have, at regions adjacent said parting line, recess means adapted to snugly receive said conductors, whereby said resin does not flow in excessive amounts around said conductors during the molding operation, and whereby said conductors are readily removed from the mold after opening thereof.

14. The invention as claimed in claim 1, in which said method further comprises mounting an additional heat-transmissive metal base in said mold cavity above, and in heat-transfer relationship to, said current-carrying electrical component, said additional base having an upper surface which is substantially flush with said upper end regions of said post.

* * * * *